United States Patent [19]
Kelly

[11] Patent Number: 6,015,219
[45] Date of Patent: Jan. 18, 2000

[54] AUXILLIARY LAMP UNIT

[75] Inventor: Fred E. Kelly, Oakville, Canada

[73] Assignee: The Louis Berkman Company, Steubenville, Ohio

[21] Appl. No.: 09/018,930

[22] Filed: Feb. 5, 1998

[51] Int. Cl.[7] .................................................. F21V 31/02
[52] U.S. Cl. ........................ 362/267; 362/241; 362/247; 362/310; 362/329; 362/374; 362/544
[58] Field of Search .................................. 362/267, 241, 362/247, 329, 310, 374, 375, 544, 546

[56] References Cited

U.S. PATENT DOCUMENTS

| | | |
|---|---|---|
| D. 243,274 | 2/1977 | Miceli . |
| D. 255,167 | 5/1980 | Hetrick . |
| D. 260,937 | 9/1981 | Hetrick . |
| D. 266,599 | 10/1982 | Suzuki . |
| D. 372,317 | 7/1996 | Kijima . |
| D. 376,661 | 12/1996 | Matthies . |
| D. 390,979 | 2/1998 | Yamamoto . |
| D. 390,980 | 2/1998 | Yamamoto . |
| 1,205,916 | 11/1916 | Meador ................................... 362/247 |
| 4,758,932 | 7/1988 | Coons ..................................... 362/546 |
| 5,327,330 | 7/1994 | Van Oel et al. ....................... 362/267 |
| 5,550,718 | 8/1996 | Shy ........................................ 362/375 |

*Primary Examiner*—Alan Cariaso
*Attorney, Agent, or Firm*—Vickers, Daniels & Young

[57] ABSTRACT

An auxiliary vehicle light comprises a housing having an opening in the front wall thereof, a lens permanently mounted on the front wall and sealingly closing the opening therein, and a reflector in the housing sealingly mounted about the opening in the front wall and cooperable with the lens to provide laterally adjacent headlight and parking/turn signal light bulb receptacles are removably mounted on the reflector for supporting light bulbs in the two light chambers, and the receptacles are accessible through an opening in the rear wall for removal from the reflector and which access opening is sealingly closed by a door.

24 Claims, 3 Drawing Sheets

AUXILLIARY LAMP UNIT

BACKGROUND OF THE INVENTION

This invention relates to the art of exterior lighting for vehicles and, more particularly, to an auxiliary light for a vehicle.

The present invention finds particular utility in connection with vehicles such as snow plows having an attached plow blade and, accordingly, is disclosed and described in detail hereinafter in connection with such use. However, it will be appreciated that the invention is applicable to other auxiliary lighting uses.

Auxiliary lights of the character to which the present invention is directed are light sources utilized to supplement a vehicle's standard lighting. These lights are often used, for example, on trucks used to plow snow or on off-road vehicles. The lights for these uses are therefore designed to either mount on the frame of a snow plow or some other external component of the vehicle capable of supporting the light.

Existing auxiliary lights have many inherent problems due to the nature of their design. Existing designs, for example, utilize a conventional sealed beam headlight within the auxiliary light housing assembly. Due to the size and weight of the conventional sealed beam headlights, the auxiliary light is undesirably heavy. This weight must be accounted for in the design, therefore requiring stronger housing materials and/or reinforcement of the components in the housing utilized to hold the light in place. In addition, the weight requires larger, more costly mounting brackets and swiveling arrangements to mount the light on a vehicle, maintain positioning of the light and allow for adjustment thereof. Furthermore, the number of mounting locations on the vehicle is limited in that the weight requires the mounting points to have more strength. Even with the increased reinforcement of the housing and larger mounts, weight remains a major concern during harsh use of the vehicle. Harsh use includes off-road driving and the use of the vehicle for plowing snow, resulting in an extreme amount of vibration and shock which is imparted to all the components of the auxiliary light, often causing premature failure and frequent breakdown.

The typical breakdown of a conventional auxiliary light results in requiring maintenance and/or replacement operations which are difficult and time consuming to perform and, often, inconvenient for the vehicle operator. In this respect, for example, a snow plow operator may have to replace the headlight during freezing temperatures and, most often, during the dark of night. In addition, off-roaders utilizing auxiliary lighting may be miles away from the nearest service station when a light fails. In both situations, tools are limited to what is carried in the vehicle, and a replacement light is many times not handy. As a result, the vehicle is either out of service or is operated with inadequate lighting. Replacement of a sealed beam headlight varies in difficulty based on the structure, age and condition of the auxiliary lighting assembly. New units are fairly easy to replace but still require many time consuming steps. One reason for the difficulty with existing auxiliary lights, is the removal of the sealed beam or other light source. Even though most light sources can be unplugged and replaced quickly, the removal of the cover plates and support thereof is difficult, can be frustrating and is time consuming. Sealed beam headlights do not include integral mounting components, thereby requiring an additional support member, a bezel, to be used to secure the light to the housing. Due to the size and shape of sealed beam headlights, at least four screws are normally used for proper attachment to the housing. Additionally, pads made of rubber or cork are needed to provide cushioning of the sealed beam against the vibrations and shocks encountered during harsh use.

Another problem is the location of the component parts which must be removed to gain access to the interior of the housing for replacing the light. In this respect, the screws used to secure the housing cover plate and the screws used to attach the sealed beam retaining bezel to the housing are located on the front side of the auxiliary light. This location exposes these screws and associated parts to the harsh weather conditions associated with the use of these vehicles. Furthermore, since the sealed beam headlight is pulled out the front of the auxiliary light housing, the front of the housing is not sealed. Even if rubber gaskets are used, the front of the housing is difficult to seal due to the sealed beam headlight. The result of this direct exposure is premature corrosion of the screws, female receptacles, bezel, and other internal housing components. When these components become corroded, replacement of the sealed beam headlight becomes even more difficult and sometimes impossible under the circumstances. Adding to these difficulties, as mentioned above, is the fact that the need for replacement often is during extreme cold and snowy weather conditions.

Not only is the replacement of sealed beam headlights difficult, their size makes storage of replacements difficult or inconvenient. Most vehicles which either plow snow or drive off-road are pick-up trucks having a limited amount of space, within the passenger compartment, for storage of articles. The user must therefore either not carry a replacement, carry the replacement within the limited space of the passenger compartment, or carry the replacement within the bed of the truck, thus exposing the sealed beam to undesirable and varying weather conditions.

Some conventional auxiliary lights house parking or parking/turn signal lights along with the sealed beam headlight. These parking and turning signal lights are important safety features of any vehicle, and especially vehicles which are used to plow snow at night. Many of these vehicles are required to make frequent stops and frequent turns to plow the streets and the driveways of a community. A turn signal light which has failed will therefore be a safety hazard. As with the sealed beam headlight, the same screws located on the front of the auxiliary light, securing the cover plate, must be removed for access to the interior of the housing to change a failed parking and/or turn signal light.

As will be appreciated from the foregoing description, auxiliary light designs which require front removal of the sealed beam and the parking and/or turn signal lights, contain many separable component parts. These parts include the housing, sealed beam, bezel, parking and turn signal light bulbs and holders, a lens or lenses, and reflectors for parking and turn signal lights, a front cover plate for the housing, and a considerable number of fasteners for mounting these components on the housing. Such a large number of component parts increases production costs and reduces the useful life of the product. Since an auxiliary light is designed and assembled so that frequent disassembly is possible, the structure of the light relies on the use of removable fasteners such as screws, nuts and bolts. Premature failure can result from stresses and strains imposed on component parts assembled by such removable fasteners. As a result, the auxiliary lights or parts thereof frequently fail due to the vibration, extreme temperature and other weather conditions associated with the use of the such vehicles on which they are mounted. Not only is the light subject to failure in the foregoing manner, but the considerable weight of the sealed beam creates additional stresses on the components of the light which promote such failure, thus further reducing the useful life of the product.

SUMMARY OF THE INVENTION

An auxiliary light in accordance with the present invention advantageously eliminates the use of a sealed beam headlight and overcomes the foregoing and other problems heretofor encountered in connection with the use thereof. In this respect, certain of the major components of the auxiliary light, including the housing lens and interior light reflectors are preferably made of strong plastic material and are permanently assembled and sealed to provide an auxiliary light having improved resistance to weather conditions and having structural characteristics capable of resisting the heavy impacts and constant vibrations that such auxiliary lights are often subjected to. Advantageously, an auxiliary light constructed according to this invention provides reduced housing failure, longer bulb life and thus longer overall life for the auxiliary light. Furthermore, a light in accordance with this invention advantageously eliminates the major disassembly heretofore required for replacement of the sealed beam headlight or other bulbs, thus further extending the life of the auxiliary light by reducing wear and tear on component parts.

Another significant feature of an auxiliary light according to this invention is a structural design allowing both the headlight and other bulbs to be removed and replaced from the rear of the housing through which releasably mounted headlight and parking/turn signal light bulb receptacles are accessible. More particularly with regard to this feature, the headlight and other bulb receptacles are accessible through an opening in the rear of housing which preferably is covered by a rear access door. The rear access door and the releasable mounting of the light bulb receptacles minimize the time and effort required for removal and replacement of the headlight and/or other bulbs and advantageously enables the front of the auxiliary light housing to be permanently sealed, thus preventing moisture, salt and other environmental debris from entering the interior thereof from the front of the light. By sealing the front of the auxiliary light, the internal components, such as the electronics and their connector are better protected. Bulb replacement is also easier to achieve than heretofore because the auxiliary light housing does not require disassembly. The only requirement is that the door of the rear of the housing be opened.

Yet another significant feature of an auxiliary light according to this invention is the replacing of conventional sealed beam lights with headlight bulbs which can be selected by the vehicle operator and, accordingly, easily upgraded from a standard bulb to a heavy duty, vibration resistant or a long life variety. Furthermore, the bulbs are small and replacements can easily be stored within the limited space of a pick-up or other truck interior. Still further, by replacing the sealed beam headlight with small replaceable bulbs, the overall size of the light unit is reduced by about one-third in comparison with the light heretofore available. Further, the components used to secure a sealed beam headlight are eliminated, and the weight is minimized in that the large heavy sealed beam headlight is replaced with a small, lighter bulb headlight and a plastic reflector. Preferably, a composite reflector is used for both the headlight and the parking/turn signal lights, further reducing the number of components, as well as the weight and cost of the unit. Therefore, an auxiliary light, according to this invention, minimizes the number of required components, reduces the size and minimizes the overall weight while maintaining the desired light intensity. The reduction of component parts advantageously increases reliability on expected life by eliminating components which can deteriorate or otherwise fail.

An auxiliary light according to this invention is also safer than conventional auxiliary light designs. In this respect, the reduced size, achievable with this invention, reduces the amount of sight obstruction allowing the operator of the vehicle greater visibility in front of the vehicle. Furthermore, high powered and long life light bulbs can be utilized to improve visibility. Visibility is especially important considering the poor, sometimes severe, conditions associated with vehicles utilizing such auxiliary lights. Another safety feature, according to a preferred embodiment of this invention, is a wrap-around design of the lens located on the front of the auxiliary light. By extending the lens around to the side of the auxiliary light, the parking/turn signal light's visibility is peripherally increased. The lights are therefore visible from both the front and the side of the vehicle and, further, the operator is more apt to notice the failure of a bulb.

It is accordingly an outstanding object of the present invention to provide an improved auxiliary light to be used in conjunction with a vehicle on which the light is subjected to severe weather and operating conditions such as a vehicle used to plow snow.

Another object is the provision of an auxiliary light of the foregoing character which eliminates the use of sealed beam headlights and utilizes headlight bulbs and parking/turn signal bulbs.

Another object is the provision of an auxiliary light of the foregoing character which enables faster and easier replacement of headlight and other bulbs than possible with auxiliary lights heretofore available.

A further object is the provision of an auxiliary light of the foregoing character which enables both the headlight bulb and parking/turn signal bulbs to be removed and replaced from the rear of the housing of the auxiliary light.

Still another object is the provision of an auxiliary light of the foregoing character which enables the front of the light housing to be permanently sealed.

Yet a further object is the provision of an auxiliary light of the foregoing character which is smaller and lighter in weight than comparable lights heretofore available.

Still a further object is the provision of an auxiliary light of the foregoing character which is comprised of a minimum number of component parts, is economical to produce and use and which has improved structural integrity and, accordingly, requires less maintenance and has a longer life expectancy than auxiliary lights heretofore available.

Another object is the provision of an auxiliary light of the foregoing character wherein the reflector and the housing are designed to promote visibility of the light peripherally thereof.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which.

DESCRIPTION OF A PREFERRED EMBODIMENT

Figure 1:
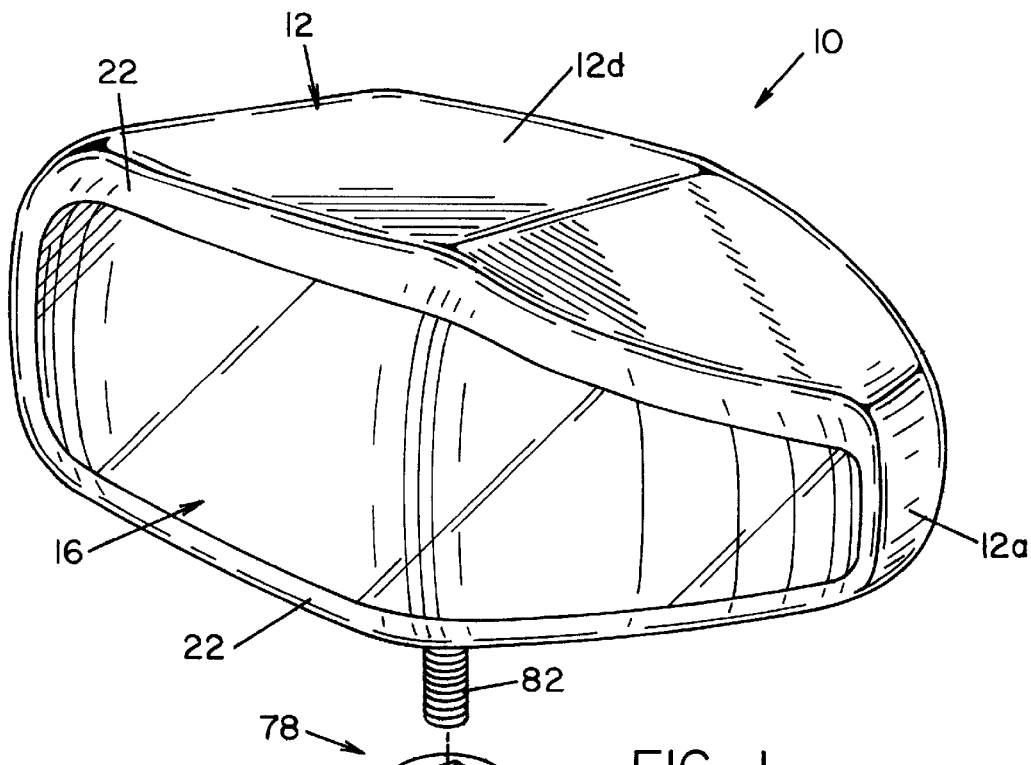
FIG. 1 is a front perspective view of an auxiliary light in accordance with the invention.
Figure 2:
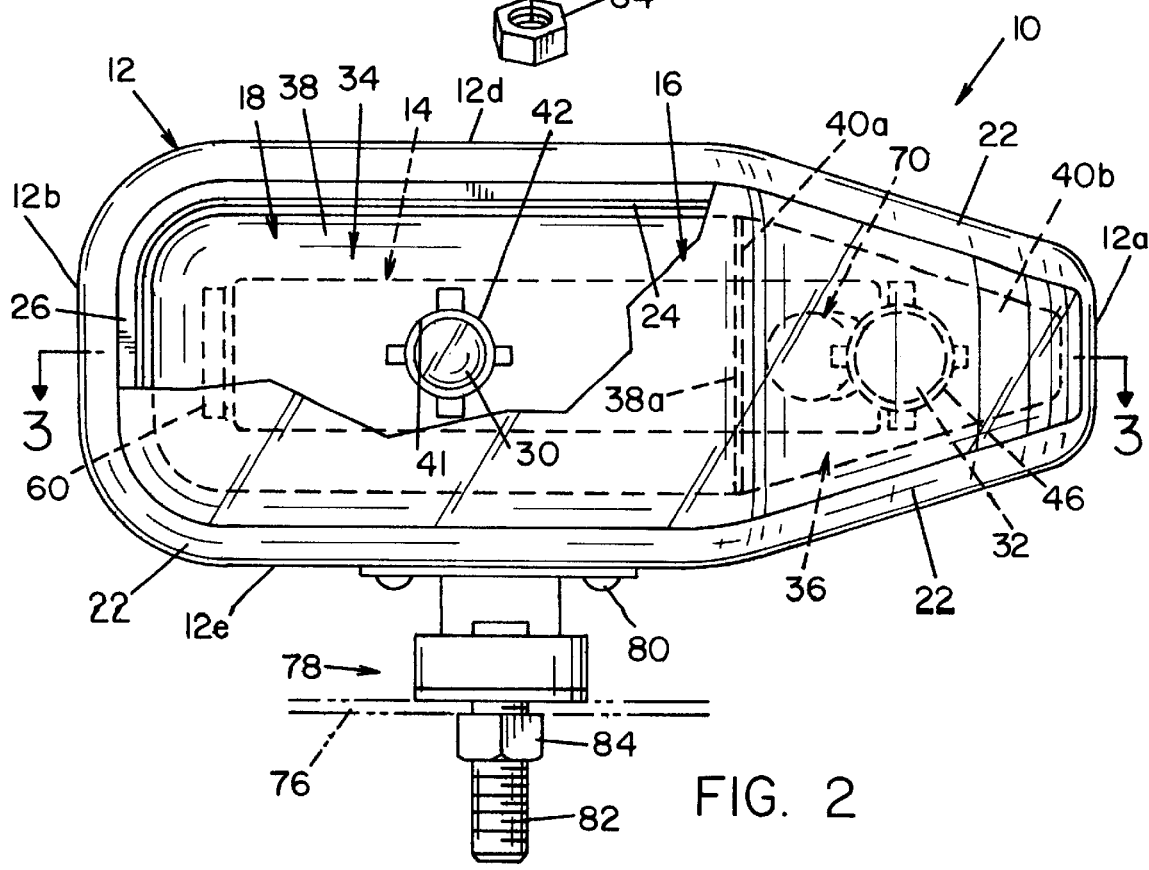
FIG. 2 is a front elevational view of the auxiliary light in FIG. 1.
Figure 3:
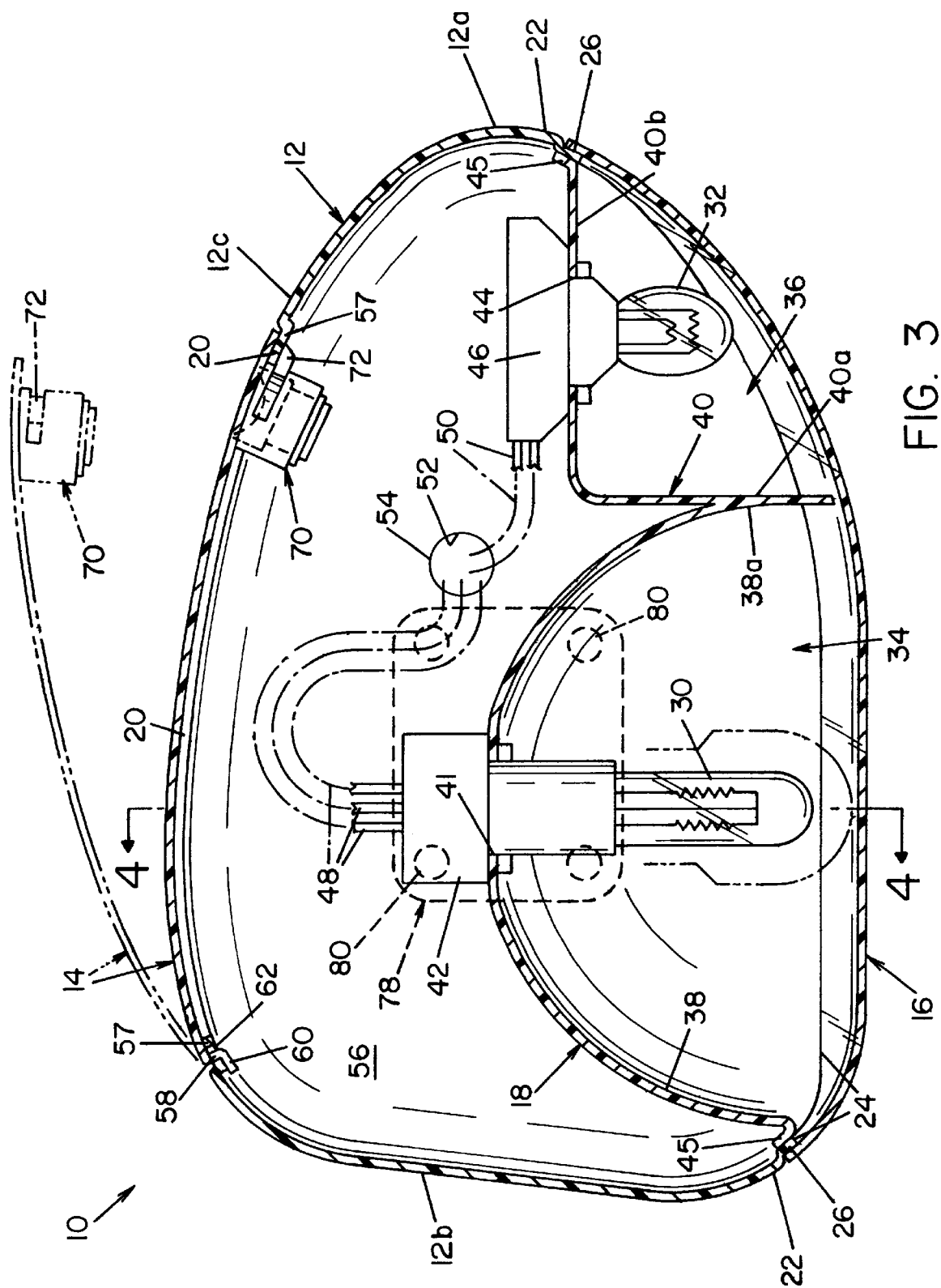
FIG. 3 is a plan view in section of the auxiliary light taken along line 3—3 in FIG. 2; and, FIG. 4 is a sectional elevation view of the auxiliary light taken along line 4—4 in FIG. 3.
Figure 4:
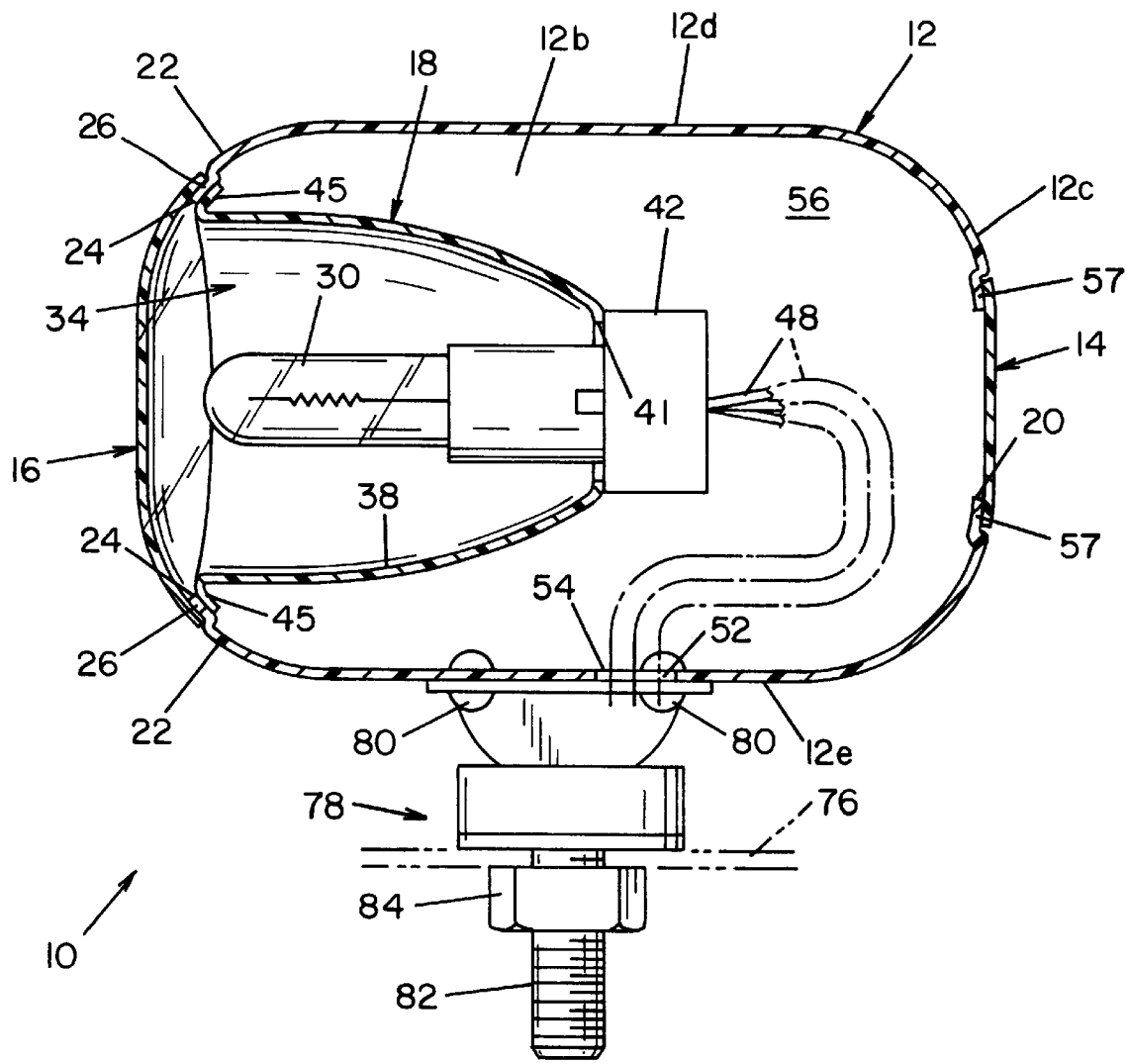

Referring now to the drawings, wherein the showings are for the purpose of illustrating a preferred embodiment of the invention only and not for the purpose of limiting the invention, FIGS. 1–4 show an auxiliary light 10 for use on a vehicle. The auxiliary light 10 has four structural components of suitable plastic materials, namely, a housing 12, a housing door 14, a lens 16, and a composite reflector 18. When viewing the auxiliary light 10 from the front, the housing includes a right end wall 12a, a left end wall 12b, a rear wall 12c, a top wall 12d, and a bottom wall 12e. The walls of housing 12 are integrally joined together and the right ends of the top and bottom walls and the rear wall and front end of the housing are contoured to converge relative to one another for the purpose set forth hereinafter. Rear wall 12c includes a rear housing opening 20, and the front edges of the side walls, top wall and bottom wall converge at the front of the housing to provide a peripheral edge 22 which forms a front housing opening 24. Edge 22 is contoured to provide an inwardly projecting edge flange 26 about the entire periphery of opening 24. Lens 16 is made of shatterproof plastic and is peripherally shaped to overlie and engage flange 26 extending about the front housing opening 24. Lens 16 is permanently and sealingly attached to flange 26 such as by a silicone cement therebetween.

Reflector 18 is mounted in housing 12 and is contoured for directing light forwardly of the housing from a headlight bulb 30 and both forward and to the right side from a park/turn signal bulb 32. More particularly in this respect, reflector 18 is shaped to provide two separate compartments, namely a headlight compartment 34 and parking/turn signal compartment 36. Reflector 18 is made from a suitable plastic material, and it will be appreciated that the compartments 34 and 36 are provided with coatings of a reflective material, not designated numerically. Headlight compartment 34 is contoured to provide a concave surface 38 to reflect light forwardly of front housing opening 24 and through lens 16. Parking/turn signal compartment 36 is contoured to provide an L-shaped surface 40 having a laterally extending portion 40b to reflect light forwardly and a portion 40a to reflect light laterally outwardly of the housing. The base of concave surface 38 is provided with an aperture 41 for removably supporting a headlight receptacle 42 which enables headlight 30 to be removed and installed from the back side of reflector 18. In this respect, for example, receptacle 42 can have a bayonet type interconnection with aperture 41. Portion 40b of surface 40 is provided with an aperture 44 for removably supporting a parking/turn signal receptacle 46 which, in the manner of receptacle 42, enables parking/turn signal bulb 32 to be removed and installed from the back side of reflector 18. It will be appreciated that portion 40a of surface 40 and the adjacent portion 38a of concave surface 38 cooperatively divide the reflector to provide the separate compartments 34 and 36. Reflector 18 is provided with a peripheral flange 45 shaped to overlie the inner side of peripheral edge flange 26 of housing 12, and the reflector is permanently and sealingly attached to the inside surface of edge flange 26 such as by a silicone cement. The interengagement of lens 16, reflector 18 and peripheral edge flange 26 is permanent and enables both headlight compartment 34 and parking/turn signal compartment 36 to be peripherally sealed relative to housing 12.

Bulb receptacles 42 and 46 are connected to a power source, such as the vehicle's battery, by wires 48 and 50, respectively. Both wires exit auxiliary light 10 through a hole 52 in bottom wall 12e which is sealed by a wire outlet seal 54. Seal 54 enables the rear housing compartment 56 behind reflector 18 to be sealed with respect to the ingress of moisture or the like across the wire outlet. When bulb receptacle 42 and bulb receptacle 46 are mounted in openings 41 and 44 therefor in reflector 18, both headlight compartment 34 and parking turn/signal compartment 36 are sealed off from the rear housing compartment 56 and the outside.

Rear housing opening 20 is generally rectangular in peripheral contour and is large enough to permit entry of a person's hand into rear compartment 56 to remove and replace both bulbs 30 and 32. Rear wall 12c of the housing includes an inwardly projecting peripheral edge flange 57 surrounding opening 20 and which receives the peripheral edge of rear housing door 14 for the latter to be flush with the outer surface of wall 12c. One end of door 14 is pivotally interconnected with rear wall 12c of the housing by an L-shaped hinge having legs 58 and 60 respectively extending inwardly through a slot 62 therefor in flange 57 and laterally outwardly under flange 57. Accordingly, as will be appreciated from FIG. 3, door 14 can be removed from the housing if desired. Flange 57 and the inner periphery of door 14 tightly interengage to peripherally seal opening 20 and, preferably, one of the opposed surfaces of flange 57 and door 14 is provided with an O-ring seal, not shown, of a suitable material such as a silicone rubber to optimize the seal. Door 14 can be held closed against flange 57 in any suitable manner and, for example, by a screw or, as shown, by a latch 70 secured to door 14 and having a keeper element 72 adapted to be extended and retracted relative to flange 57 by rotating an actuator, not shown, which is accessible from the outer side of the door for turning by hand or by a tool such as a screwdriver. It will be appreciated that keeper 72, when extended as shown in the solid line position thereof in FIG. 3, engages beneath flange 57 to hold door 14 in the closed position.

Auxiliary light 10 is preferably mounted on a plow frame member 76 by way of a swivel mount 78, which enables the auxiliary light to be swiveled and rotated for adjustment thereof. Swivel mount 78 is permanently mounted on bottom wall 12e of housing 12 by way of fasteners 80 and in mounted on frame member 76 by bolt 82 and nut 84. It will be appreciated of course that auxiliary light 10 is preferably one of a pair of lights used on the vehicle, and that the second auxiliary light is structurally the same except for being reversed such that lens 16 would wrap around to left end of the housing.

While considerable emphasis has been placed herein on the preferred embodiment illustrated and described, it will be appreciated that other embodiments can be devised and that many changes can be made in the preferred embodiment without departing from the principals of the invention. Accordingly, it is to be distinctly understood that the foregoing descriptive matter is to be interpreted merely as illustrative of the invention and not as a limitation.

Having thus described the invention, it is claimed:

1. An auxiliary vehicle light comprising a housing having top and bottom walls, a pair of side walls and front and rear walls, an opening in said front wall, a lens permanently mounted on said front wall for sealingly closing said opening therein, a reflector in said housing having a surface for reflecting light toward said lens and having a peripheral edge permanently and sealing connected to said housing for said lens and said reflector to provide a light chamber therebetween in said housing, an opening in said rear wall, a light bulb receptacle removably mounted on said reflector for supporting a light bulb in said light chamber, said receptacle being accessible through said opening in said rear wall for removal from said reflector, and a door for closing said opening in said rear wall.

2. A light according to claim 1, wherein said front wall of said housing has outer and inner surfaces and said lens is adhesively bonded and sealed against said outer surface about the periphery of said opening in said front wall.

3. An auxiliary vehicle light comprising a housing having top and bottom walls, a pair of side walls and front and rear walls, an opening in said front wall, a lens permanently mounted on said front wall for sealingly closing said opening therein, a reflector in said housing having a surface for reflecting light toward said lens and having a peripheral edge permanently and sealing connected to said housing for said lens and said reflector to provide a light chamber therebetween in said housing, an opening in said rear wall, a light bulb receptacle removably mounted on said reflector for supporting a light bulb in said light chamber, said receptacle being accessible through said opening in said rear wall for removal from said reflector, and a door for closing said opening in said rear wall, wherein said front wall of said housing has outer and inner surfaces and said lens is adhesively bonded and sealed against said outer surface about the periphery of said opening in said front wall and said peripheral edge of said reflector is adhesively bonded and sealed against said inner surface of said front wall about the periphery of the opening therein.

4. A light according to claim 1, wherein said door and said rear wall sealingly interengage about the periphery of the opening in said rear wall.

5. A light according to claim 1, wherein said door is pivotally supported on said rear wall, and means for latching said door to close said opening in said rear wall.

6. A light according to claim 5, wherein said door is removable from said housing.

7. A light according to claim 5, wherein said door and said rear wall sealingly interengage about the periphery of the opening in said rear wall.

8. A light according to claim 7, wherein said front wall of said housing has outer and inner surfaces and said lens is adhesively bonded and sealed against said outer surface about the periphery of said opening in said front wall.

9. An auxiliary vehicle light comprising a housing having top and bottom walls, a pair of side walls and front and rear walls, an opening in said front wall, a lens permanently mounted on said front wall for sealingly closing said opening therein, a reflector in said housing having a surface for reflecting light toward said lens and having a peripheral edge permanently and sealing connected to said housing for said lens and said reflector to provide a light chamber therebetween in said housing, an opening in said rear wall a light bulb receptacle removably mounted on said reflector for supporting a light bulb in said light chamber, said receptacle being accessible through said opening in said rear wall for removal from said reflector, and a door for closing said opening in said rear wall, said door being pivotally supported on said rear wall, and means for latching said door to close said opening in said rear wall, said door and said rear wall sealingly interengage about the periphery of the opening in said rear wall wherein said front wall of said housing has outer and inner surfaces and said lens is adhesively bonded and sealed against said outer surface about the periphery of said opening in said front wall and said peripheral edge of said reflector is adhesively bonded and sealed against said inner surface of said front wall about the periphery of the opening therein.

10. A light according to claim 9, wherein said housing, said lens, said reflector and said door are constructed of plastic material.

11. A light according to claim 1, wherein said housing, said lens, said reflector and said door are constructed of plastic material.

12. An auxiliary vehicle light comprising a housing having top and bottom walls, a pair of side walls and front and rear walls, an opening in said front wall, a lens permanently mounted on said front wall for sealingly closing said opening therein, reflector means in said housing having surfaces for reflecting light toward said lens and cooperable with said lens for providing first and second light chambers, said reflector means having peripheral edge means permanently and sealingly connected to said housing, an opening in said rear wall, first and second light bulb receptacles removably mounted on said reflector means for respectively supporting a light bulb in said first and second light chambers, said first and second receptacles being accessible through said opening in said rear wall for removal from said reflector means, and a door for closing said opening in said rear wall.

13. A light according to claim 12, wherein the surface of said first light chamber is arcuate and concave relative to said lens and the surface of said second light chamber includes a first planar surface facing said front wall of said housing and a second planar surface facing one of said side walls of said housing.

14. A light according to claim 13, wherein said arcuate surface of said first light chamber includes a surface portion laterally adjacent said second surface of said second light chamber.

15. A light according to claim 14, wherein the portions of said reflector means providing said surface portion and said second surface are integral.

16. An auxiliary vehicle light comprising a housing having top and bottom walls, a pair of side walls and front and rear walls, an opening in said front wall, a lens permanently mounted on said front wall for sealingly closing said opening therein, reflector means in said housing having surfaces for reflecting light toward said lens and cooperable with said lens for providing first and second light chambers, said reflector means having peripheral edge means permanently and sealingly connected to said housing, an opening in said rear wall, first and second light bulb receptacles removably mounted on said reflector means for respectively supporting a light bulb in said first and second light chambers, said first and second receptacles being accessible through said opening in said rear wall for removal from said reflector means, and a door for closing said opening in said rear wall wherein the surface of said first light chamber is arcuate and concave relative to said lens and the surface of said second light chamber includes a first planar surface facing said front wall of said housing, and a second planar surface facing one of said side walls of said housing, said front wall of said housing has outer and inner surfaces and said lens is adhesively bonded and sealed against said outer surface about the periphery of said opening in said front wall, said peripheral edge means of said reflector means being adhesively bonded and sealed against said inner surface of said front wall about the periphery of said opening therein.

17. A light according to claim 16, wherein said door and said rear wall sealingly interengage about the periphery of the opening in said rear wall.

18. A light according to claim 17, wherein said door has opened and closed positions relative to said opening, and means for latching said door in said closed position.

19. A light according to claim 18, wherein said door is pivotally supported on and removable from said rear wall and said means for latching includes a latch on said door including a keeper for releasable interengagement with said rear wall.

20. A light according to claim 17, wherein said housing, said lens, said reflector means and said door are constructed of plastic material.

21. A light according to claim 20, wherein said first and second light chambers are laterally adjacent and the laterally adjacent portions of said reflector means providing said arcuate and said second planar surface are integral with one another.

22. A light according to claim 21, wherein said door has opened and closed positions relative to said opening and is pivotally and removably mounted on said rear wall, and a latch on said door including a keeper for releasably interengaging with said rear wall for latching said door in said closed position.

23. An auxiliary vehicle light comprising a housing having top and bottom walls, a pair of side walls, a rear wall and a front wall contiguous to said top, bottom and pair of side walls, an opening in said front wall, a lens permanently mounted on said front wall for sealingly closing said opening therein, a reflector in said housing having a surface for reflecting light toward said lens and having a peripheral edge permanently and sealing connected to said housing for said lens and said reflector to provide a light chamber therebetween in said housing, an opening in said rear wall, a light bulb receptacle removably mounted on said reflector for supporting a light bulb in said light chamber, said receptacle being accessible through said opening in said rear wall for removal from said reflector, and a door for closing said opening in said rear wall.

24. An auxiliary vehicle light comprising a housing having top and bottom walls, a pair of side walls and front and rear walls, an opening in said front wall, a lens permanently mounted on said front wall for sealingly closing said opening therein, a reflector in said housing having a surface for reflecting light toward said lens and having a peripheral edge permanently and sealing connected to said housing for said lens and said reflector to provide a light chamber therebetween in said housing, an opening in said rear wall, a light bulb receptacle removably mounted on said reflector for supporting a light bulb in said light chamber, said receptacle being accessible through said opening in said rear wall for removal from said reflector, and a door for closing said opening in said rear wall, wherein said front wall of said housing has outer and inner surfaces and said peripheral edge of said reflector is adhesively bonded and sealed against said inner surface of said front wall about the periphery of the opening therein.

* * * * *